United States Patent

[11] 3,624,611

| [72] | Inventor | Howard Leroy Wirsing<br>Wiesbaden, Germany |
|---|---|---|
| [21] | Appl. No. | 17,655 |
| [22] | Filed | Mar. 9, 1970 |
| [45] | Patented | Nov. 30, 1971 |
| [73] | Assignee | GTE Automatic Electric Laboratories,<br>Incorporated<br>Northlake, Ill. |

[54] STORED-LOGIC REAL TIME MONITORING AND CONTROL SYSTEM
9 Claims, 3 Drawing Figs.

| [52] | U.S. Cl. | 340/172.5 |
|---|---|---|
| [51] | Int. Cl. | G06f 9/16,<br>G05b 19/28 |
| [50] | Field of Search | 340/172.5 |

[56] References Cited
UNITED STATES PATENTS

| 3,246,303 | 4/1966 | Amdahl et al. | 340/172.5 |
|---|---|---|---|
| 3,246,304 | 4/1966 | Brown, Jr. et al. | 340/172.5 |
| 3,258,748 | 6/1966 | Schneberger | 340/172.5 |
| 3,348,214 | 10/1967 | Barbetta | 340/172.5 |
| 3,353,157 | 11/1967 | Chesarek et al. | 340/172.5 |
| 3,371,320 | 2/1968 | Lachenmayer | 340/172.5 |
| 3,400,379 | 9/1968 | Harman | 340/172.5 |

*Primary Examiner*—Garth D. Shaw
*Assistant Examiner*—Jan E. Rhoads
*Attorneys*—Cyril A. Krenzer, K. Mullerheim and B. E. Franz

ABSTRACT: A stored-logic real time monitoring and control system which includes a first storage device for sequentially storing the switching logic descriptions of a desired combinational sequential or the like logic function to be performed and a second storage device for storing the present input status to the switching logic descriptions. Individual hardware versions of the desired switching logic descriptions are provided and selectively allowed to repetitively operate upon the monitored input signals in accordance with the stored switching logic descriptions in such a fashion as to allow the desired real time monitoring and control.

STORED-LOGIC REAL TIME MONITORING AND CONTROL SYSTEM

BACKGROUND OF THE INVENTION

The present invention relates to monitoring and control systems and more particularly to a real time monitoring and control system wherein both the logical descriptions of the control and monitoring system and the last look status of the logical descriptions resulting from subjecting each hardware version thereof to its appropriate input stimulus are stored in memory and continuously updated in a manner such that the desired real time monitoring and control is readily implemented without the need for sophisticated programming or complex fixed-wiring structures.

In the field of real time monitoring and control there are presently two basically different types of systems which are in wide use in industry. These are the "wired-logic" and "stored-program" systems.

The "wired-logic" computer system is designed as a fixed logical arrangement for handling a particular problem. In order to handle a different problem the system wiring must be changed to a different fixed logical arrangement with all of the obvious difficulties and expense of modifying and rewiring the same. Basically then, the "wired-logic" system is not very adaptive to changing requirements.

On the other hand, the "stored-program" computer system is designed with great flexibility and the capability for solving many different problems under the control of a different program. While generally satisfactory for their intended purposes, the "stored-program" computer requires extremely high-speed and complex logic elements with associated packaging problems. Thus substantial quantities of logic are usually needed to implement the "stored-program" system although generally less than that required to implement a system of equivalent task complexity with the "wired-logic" concept. The major difficulty, however, with the "stored-program" computer system is that the wired-logic designer not knowledgeable in computer programming generally cannot program the computer to enable a particular problem being handled to be implemented. This is because techniques for programming have very little relation to the logical process of monitoring and control. Thus a computer programmer in addition to the logic designer is needed to implement a particular program.

Recently, others, such for example as Amdahl et al. in U.S. Pat. No. 3,246,303 entitled "Stored Logic Computer," have devised a technique which is intermediate to that of the "wired-logic" system and the "stored-program" system such that a wired-logic designer can design the logic circuit for a control system and then place coded representations of the logic circuit in memory and have the desired logic functions implemented without having to do the actual wiring or developing a sophisticated computer program. While the prior art techniques for developing a stored-logic computer have generally been somewhat satisfactory, the circuitry and formats for implementing the same are generally complex other then for the most simple of logic operations.

SUMMARY OF THE INVENTION

Accordingly, one object of the present invention is to provide a new and improved stored-logic system for real time monitoring and control.

Another object of this invention is the provision of a unique real time monitoring and control system wherein the signals representative of the logical elements of the control and monitoring system to be implemented are stored in such a manner that a combinational logic function or the like can be easily realized without the need for a fixed-wire structure or a sophisticated program.

Still another object of the subject invention is the provision of a new and improved stored-logic real time monitoring and control system which is both simple in construction and implementation.

A still further object of this invention is to provide a new and improved stored-logic monitoring and control system wherein only a single hardware version of each logic element is needed even though a combinational logic function or the like to be performed includes a plurality of such elements.

One other object of the subject invention is the provision of unique stored-logic real time monitoring and control system wherein both the logical elements and the last look status of the logical elements resulting from subjecting each element to its appropriate input stimulus are stored in memory and continuously updated so as to allow continuous monitoring and control.

Briefly, in accordance with the preferred embodiment of this invention, these and other objects are attained by storing the switching logic description of the control and monitoring function in memory. In addition, the last look status of the switching logic resulting from subjecting each element to its appropriate input stimulus, both from other elements and from the system-sensing devices is stored in memory. Resulting control signals are then allowed to direct the behavior of elements to be controlled. By repetitive review of the switching logic status, in conjunction with the status of the system-sensing elements, real time monitoring and control is realized.

BRIEF DESCRIPTION OF THE DRAWINGS

A more complete appreciation of the invention will be readily apparent as the same becomes better understood by reference to the following detailed description when considered in connection with the accompanying drawings wherein.

DETAILED DESCRIPTION OF THE PREFERRED EMBODIMENT

Figure 1:
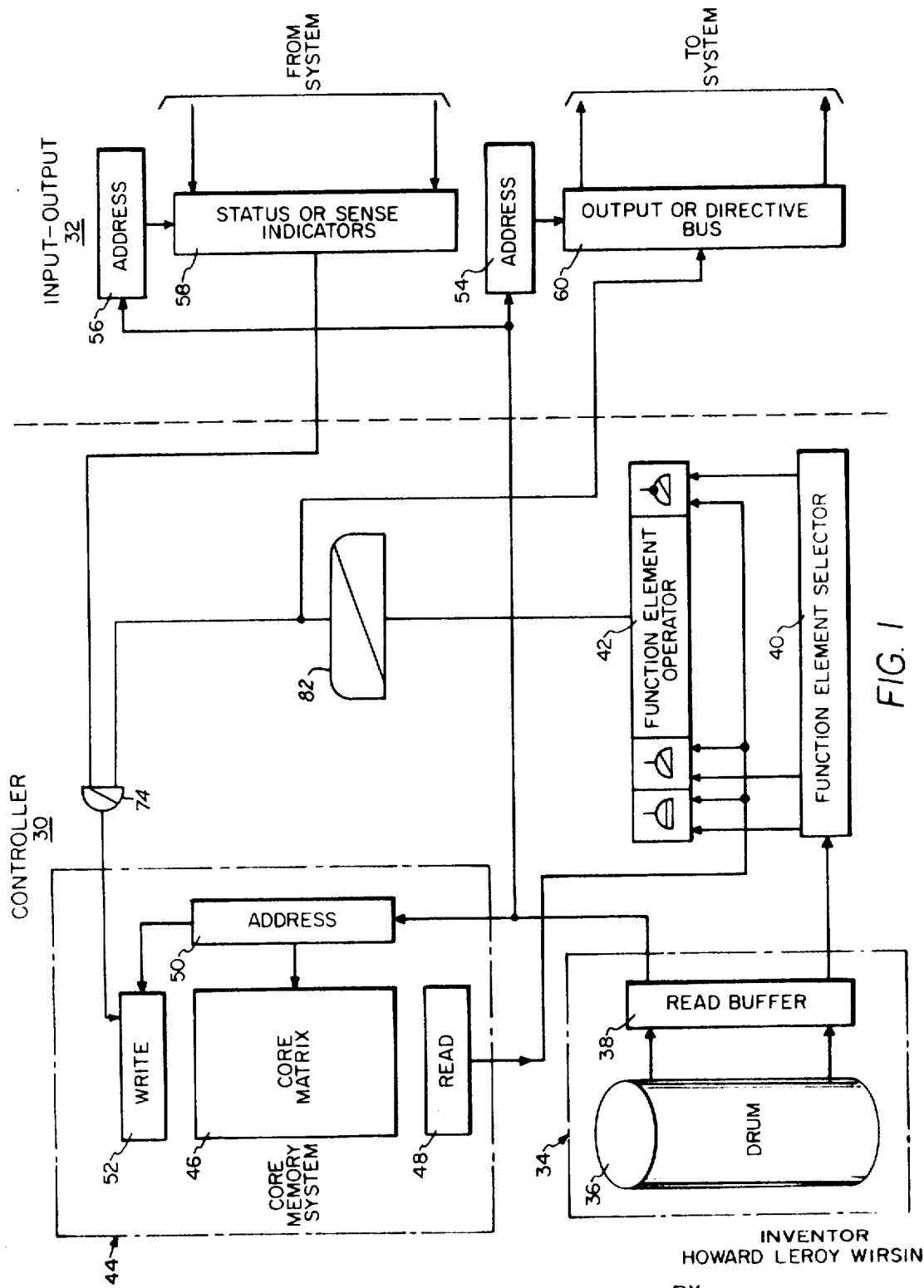
FIG. 1 is an overall block diagram showing the stored-logic real time monitoring and control system according to the present invention.

Referring now to the drawings wherein like reference numerals designate identical, or corresponding parts throughout the several views, and more particularly to FIG. 1 thereof wherein the overall block diagram of the stored-logic system according to the present invention is shown as including a controller portion 30 for monitoring information from a system under control, such for example as a telephone exchange or the like, and in response thereto for generating proper control functions and an input-output portion 32 for receiving the monitored input information over a status or sense-indicating bus 58 and for supplying proper control functions over an output or directive bus 60.

More particularly, the controller portion 30 is shown as including a synchronous memory device 34, such for example as a sequentially readout magnetic drum 36, for storing on a logic function element bases the switching logic descriptions of the monitoring and control functions desired. The stored-logic function elements are then sequentially read from storage through a conventional read buffer 38, such for example as a series of flip-flop stages, and the present input status of the logic function elements which are stored in a random access memory system 44 are subjected to the inputs of a hardware version of the logic function element desired. The hardware version of the logic function elements requires only one of each type of function needed and the unit which includes the same is designated as function element operator 42 and is shown by way of example as including the conventional AND, OR, and NOR functions. A function element selector 40, which is a conventional decoder, is used to select the desired logic function element within the function element operator 42. The random access memory system 44, may be a magnetic core matrix 46, and is used to maintain the present input status to the various logic function elements. It should be understood that the need exists for random access of the function elements as a result of the nonsequential nature of a logical structure. For example, driven functional elements in a logical structure may be distributed throughout the topography thereof. Now, the resulting output from the function element operator 42 is used to upgrade the appropriate inputs to the driven elements, both internal to the stored switching logic image by upgrading their stored input status within the random access memory system 44 and external to the switching logic image by upgrading the system under control through the output or directive bus 60. By repetitively reviewing the switching logic status, in conjunction with the status of the system sensing elements, real time monitoring and control is realized. It should be understood that conventional address registers 50, 54 and 56 are respectively used to select and direct a storage, (such as a stored input condition) monitor or control (such as outputs for the internal system) function during operation of the system. Also conventional read circuit 48 and write circuit 52 are utilized for reading information from the core matrix 46 and for allowing updated information to be written therein.

In order to enable a more thorough understanding of the operation of the stored-logic system of FIG. 1, the implementation of an exemplary simple combinational logic function using switching logic elements will be described hereinafter with reference to FIG. 2 and 3.

Figure 2:
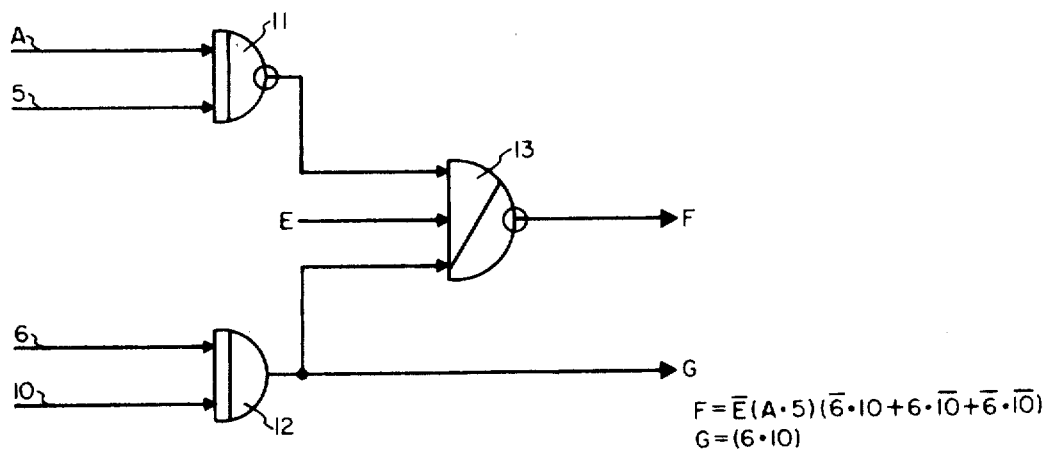
FIG. 2 illustrates an exemplary combinational logic function circuit which may be implemented with the system of the present invention as explained with reference to FIG. 3.

More particularly, referring now to FIG. 2 the exemplary combinational logic circuit is shown as including an interconnection between three conventional digital logic element gates, namely, a NAND-gate 11, and AND-gate 12 and a NOR-gate 13. By way of example, it can be assumed that the inputs designated 5, 6, and 10 represent external stimulus received from other function elements of the control system, while the inputs designated A and E represent sense conditions from the system under monitor, i.e., a telephone exchange. The output signals designated F and G are output directive signals and depending upon the condition of the monitored system will be used for driving both other function elements and for controlling the monitored system. In the example, let us assume that the sensed input A is represented by the logical binary condition "1," while the sensed input E is represented by the logical binary condition "0."

Figure 3:
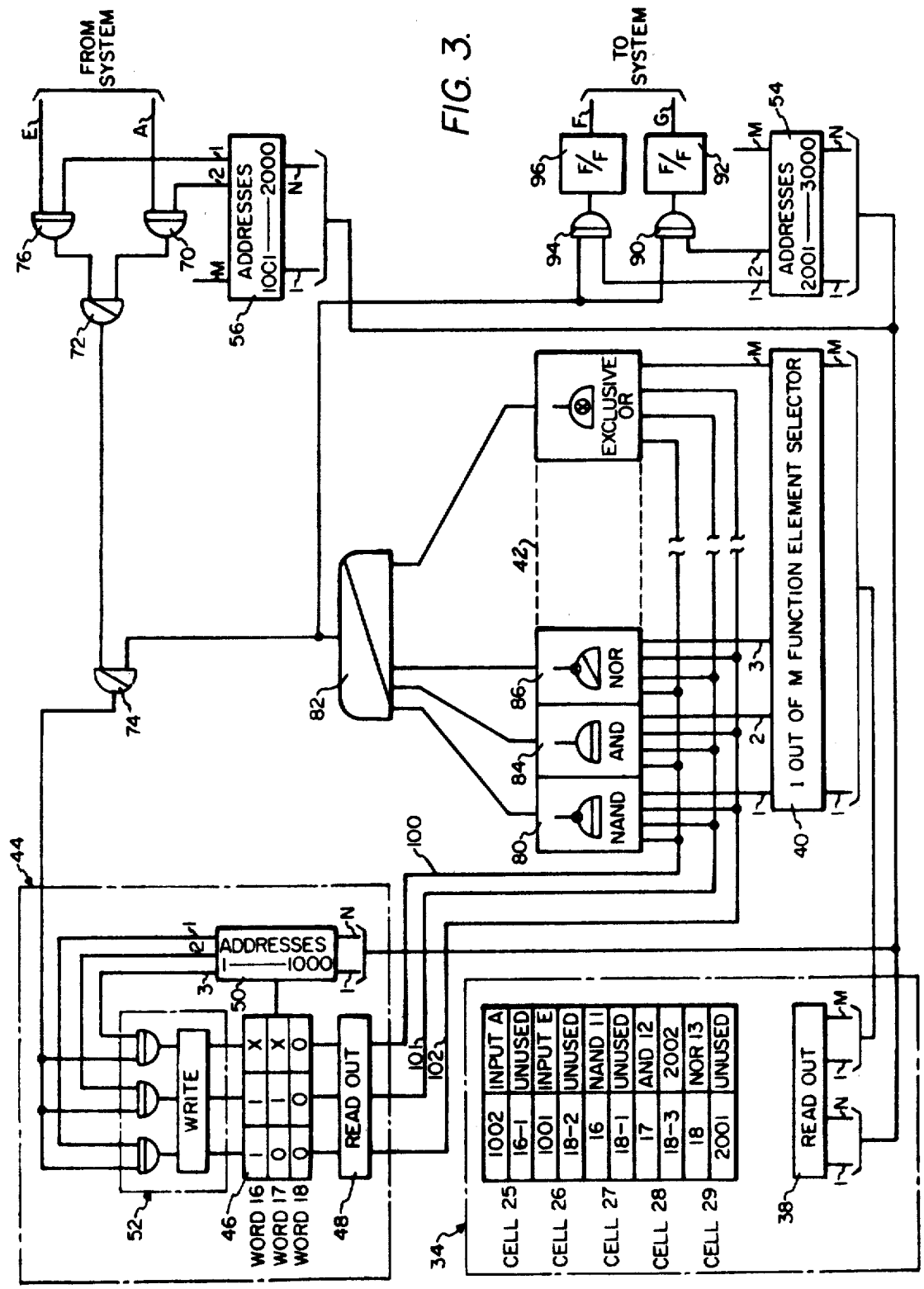
FIG. 3 illustrates in block diagram form how the exemplary combinational logic function circuit of FIG. 2 can be implemented with the stored logic real time monitoring and control system of the present invention.

FIG. 3 shows the sequence of instructions within the drum memory system 34 and associated circuitry for implementing the combinational logic function of FIG. 2. Before describing the sequence of instructions, it should be noted that the respective address registers 50, 54, and 56 have been designated for explanatory purposes as having address groups 1 thru 1,000, 1,001 thru 2,000 and 2,002 thru 3,000. Obviously, in an actual system compatible address groups for the three respective registers would be used. Referring now to the sequence of instructions, it is seen that start time is with cell 25 on the drum 36 of FIG. 1, the first operation is to access cell 25 and read the first word into the readout buffer 38. The left half of the first word, name, "1002" contains the address of the input gate that is being subjected to the input A whose level as explained above is a binary "1." The address "1002" when read out by readout buffer 38 is directed to the input address register 56 which encompasses addresses numbered from "1001" to "2000." The rightmost digit of the cell 25 address, namely, "2," serves to apply a signal on the output lead "2" of address register 56 and thereby gates the A condition onto the input bus through a conventional AND-gate 70. The function code located in the right hand portion of the first word in cell 25, namely, "Input A" is then decoded to indicate a transfer to memory core operation. The left-hand portion of the second word in cell 25, namely, "16-1" is then read out and indicates that the input bus condition described above is to be placed in bit location "1" of word 16 of the core memory matrix 44 through OR-gates 72 and 74. The second word right-hand output directive is not used in this case and is designated as "unused." It should be understood that up to now the present status of the monitored input A to gate 11 (see FIG. 2) has been stored in word 16 (bit location "1") of the core memory matrix 44.

The next sequence of operation is to read the first word of cell 26 from the drum memory 36. The indicated input status cell memory address, namely, "1001" is read through readout buffer 38 and here again an input gate, namely, AND-gate 76, is selected and the present condition of point E of the system being monitored and controlled is transferred to the input bus. Again the right-hand function code of the first word of cell 26 indicates a transfer to core memory matrix 44. The second word of cell 26 is read from the drum 36 and the left-hand portion thereof, namely "18-2" indicates that the status of E is to be placed in lit location "2" of word 18 of the core memory matrix 44. Again, the left-hand output address directive is not used. The present status condition of the monitored input E to gate 13 (FIG. 2) has now been properly stored in word 18 (bit location "2") of the core memory matrix 44.

The next sequence of operation is to read the first word of cell 27. The left-hand portion of that word, namely "16," is directed to address register 50 and indicates that the last look condition of the inputs of logic element 11 stored therein are to be read out from the core memory matrix 44 through read out buffer 48. This status word is presented to the input bus of the function element operator 42 over leads 100, 101, and 102. The right-hand function code portion of the first word of cell 27, namely NAND 11, is presented through readout buffer 38 to the function code decoder 40 and the NAND-function 80 is selected over lead 1 to act upon the last look condition of the inputs thereto from word 16 stored in the core memory matrix 44. The resulting output from the NAND-gate 80 is then placed on the function operator output bus through OR-gate 82. The second word of cell 27 is then read and the left-hand address directs the output appearing on the operator bus to be written into bit location "1" of word 18 of the core memory matrix 44 through OR-gare 74 and write gates and circuitry 52. Here again, the right-hand output address directive of the second word of cell 27 is unused. It should be understood that the present output of NAND-gate 11 has now been obtained and placed in bit location "1" of word 18.

In the next sequence of operation the first word cell 28 is read from the drum 36. The left-hand side of the word directs that the indicated input status cell core memory address, namely "17," be read from the memory core matrix 44. This status word which represents the present condition of the input to AND-gate 12 (see FIG. 2) is presented to the input bus of the function element operator 42. The right-hand side of the first word of cell 28 presents the AND function element selection code over lead 2 to the function code decoder 40 and AND-gate 84 is allowed to act upon the last look conditions read from the core memory matrix 44. The resulting output from the AND-gate 84 is then placed on the function operator output bus through OR-gate 82. The next word of cell 28 is read from the drum memory 36 and the left-hand address, namely "18-3," directs the output of the function operator bus to be placed in bit location "3" of word 18 of the core memory matrix 44. The right-hand address directs the output of the function operator output to be also placed in bit position "2" of the output directive bus through the address register 54 for controlling the system under monitor. Thus, the output of the function operator bus and the signal on lead 2 of the address register 54 will cause a signal to be emitted from conventional AND-gate 90 which in turn will trigger a conventional flip-flop 92 or the like to provide the desired control signal G to the system.

In the next sequence of operation the first word of cell 29 is read from drum 36 through readout buffer 38. The left-hand portion of the word indicates the the input status cell core memory address "18" which represents the present input conditions to NOR-gate 13 (see FIG. 2) is read through readout buffer 48 of the core memory matrix 44. Again in the same manner as described before, this status word is presented to the input of the function element operator 42. The right-hand side of the first word in cell 29 indicates that the function element selection code for the NOR gate function is to be presented to the function code decoder 40 and the conventional NOR-gate 86 is allowed to act upon the last look conditions applied thereto. The next word of cell 29 is then read from drum 36. The left-hand address, namely "2001," also causes an output directive control signal, namely F, to be generated by placing the status of the output bus of the function operator in bit position "1" of the output directive bus and thereby gating AND-gate 94, the output of which triggers flip-flop 96 to provide the desired control signal.

It should now be apparent that the desired output directives F and G for the exemplary combinational logic circuit have been uniquely generated through the simple stored-logic system of the present invention.

It should also be apparent that the inputs 5,6, and 10 are the outputs from gates which were developed in a manner similar to that described above for NAND-gate 11 and AND-gate 12. In addition it should be understood that the sequence described in the example above requires that the gates be ordered so that each gate or function element is acted upon only after all input conditions have had an opportunity to be upgraded during the present cycle of drum 36. This merely requires a very simple ordering by level starting with the furthest level away from the most distant output.

It should also be understood that while only one word (two possible output address directives) was used for each function element that the invention is not so limited and that as many output directive words as required may be assigned.

Obviously, numerous modifications and variations of the present invention are possible in light of the above teachings. For example, while the implementation for a typical combinational logic function was illustrated above, the stored-logic system of the present invention is not so limited and may be used to implement the storage element as a logic element and as a result allow for sequential or combinational-sequential arrangements to be stored. In fact, any circuit or function that can be realized by hardware can be implemented as long as it is, or can be, represented digitally. Likewise, it should be understood that while in the combinational logic function example set forth above only one stored-logic image was used that multiple appearances of the same logic functions within the same drum cycle are possible and would allow for a faster drum cycle time. Also, while function elements have been shown as having a single output, the invention is not so limited and multioutput function elements may be readily implemented. Additionally, while a separated drum and core have been shown for purposes of storage, it should be apparent that the entire system could be placed in a single memory storage. It is, therefore, to be understood that within the scope of the appended claims the invention may be practiced otherwise than as specifically described herein.

What is claimed as new and described to be secured by Letters Patent of the united States is:

1. A stored-logic real time monitoring and control system comprising:
   means for storing switching logic descriptions of desired control and monitoring functions;
   means for providing a plurality of different hardware logic elements, each of which is representative of a different one of said switching logic descriptions;
   means for sequentially subjecting each logic element representative of said switching logic descriptions to an appropriate input stimulus;
   means for storing a last look condition resulting from said subjecting of each logic element to an appropriate input stimulus; and
   means for continuously allowing resulting control signals generated by said logic elements to direct the behavior of a system under control.

2. A stored-logic real time monitoring and control system as in claim 1 wherein said means for storing said switching logic descriptions is a sequentially readout memory device.

3. A stored-logic real time monitoring and control system as in claim 2 wherein said means for storing the last look conditions is a random access memory device 4. A stored-logic real time monitoring and control system as in claim 3 wherein said means for subjecting each logic element to its appropriate input stimulus includes a function element sector to for decoding a particular one of said switching logic description which is sequentially read from said sequentially readout memory device such that said input stimulus is applied to the hardware version logic element representative of said switching logic description and the output therefrom is either or both stored in said random access memory or gated for generating a proper control signal.

5. A stored-logic real time monitoring and control system as in claim 4 wherein is further included a first address register, a second address register, and a third address register for respectively selecting and directing a storage, monitor or output control function during the operation of said system.

6. A stored-logic real time monitoring and control system as in claim 5 wherein said sequentially readout memory device is a magnetic drum.

7. A stored-logic real time monitoring and control system as in claim 6 wherein said random access memory device is a magnetic core matrix.

8. A stored-logic real time monitoring and control system as in claim 7 wherein is included input gating circuitry including at least an AND gate and an OR gate for receiving monitored information from a system under control and for applying the same to said magnetic core matrix.

9. A stored-logic real time monitoring and control system as in claim 8 wherein said means for continuously allowing resulting control signals includes output gating circuiting having at least an AND gate and a flip-flop gate for applying said resulting control signals to a system under monitor and control.

* * * * *

UNITED STATES PATENT OFFICE
CERTIFICATE OF CORRECTION

Patent No. 3,624,611            Dated November 30, 1971

Inventor(s) Howard L. Wirsing

It is certified that error appears in the above-identified patent and that said Letters Patent are hereby corrected as shown below:

Front Page - Under Assignee, delete "," after Laboratories

Column 6, line 27, delete "its" and add -- an -- line 28, "Sector" should be -- selector -- line 54 "Flip-flop" should be capitalized

Signed and sealed this 23rd day of January 1973.

(SEAL)
Attest:

EDWARD M. FLETCHER, JR.                 ROBERT GOTTSCHALK
Attesting Officer                       Commissioner of Patents